(12) United States Patent
Hemmelmann et al.

(10) Patent No.: US 8,766,753 B2
(45) Date of Patent: Jul. 1, 2014

(54) IN-SITU MAGNETIZER

(75) Inventors: Jan Erich Hemmelmann, Munich (DE); Michal-Wolfgang Waszak, Nandlstadt (DE); Tiziana Bertoncelli, Garching b. Muenchen (DE); Alexander Felix Fiseni, München (DE)

(73) Assignee: General Electric Company, Niskayuna, NY (US)

( * ) Notice: Subject to any disclaimer, the term of this patent is extended or adjusted under 35 U.S.C. 154(b) by 822 days.

(21) Appl. No.: 12/499,823

(22) Filed: Jul. 9, 2009

(65) Prior Publication Data

US 2011/0006865 A1   Jan. 13, 2011

(51) Int. Cl.
*H01F 7/20* (2006.01)

(52) U.S. Cl.
USPC .......................................... 335/284; 335/184

(58) Field of Classification Search
USPC .......................................... 335/284
See application file for complete search history.

(56) References Cited

U.S. PATENT DOCUMENTS

| | | | |
|---|---|---|---|
| 4,390,815 A | 6/1983 | Key et al. | |
| 4,812,692 A * | 3/1989 | Arita | 310/216.097 |
| 6,441,521 B1 | 8/2002 | Dombrovski et al. | |
| 6,674,205 B2 | 1/2004 | Biais et al. | |
| 6,684,483 B2 | 2/2004 | Rahman et al. | |
| 7,148,598 B2 | 12/2006 | Ionel et al. | |
| 7,204,012 B2 * | 4/2007 | Kloepzig et al. | 29/598 |
| 7,479,723 B2 | 1/2009 | Dawsey et al. | |
| 2003/0047625 A1 * | 3/2003 | Tinwell et al. | 239/585.4 |
| 2005/0231057 A1 | 10/2005 | Kloepzig et al. | |

FOREIGN PATENT DOCUMENTS

| | | |
|---|---|---|
| DE | 10049766 A1 | 4/2002 |
| EP | 1179883 A2 | 2/2002 |
| EP | 2020662 A2 | 2/2009 |
| JP | 63316658 A | 12/1988 |
| JP | 63316658 A * | 12/1988 |
| JP | 3671621 B2 | 7/2005 |
| WO | 0241334 A1 | 5/2002 |
| WO | 2008116464 A2 | 10/2008 |

OTHER PUBLICATIONS

C.K. Lee and B.I. Kwon; "Study in the post-assembly magnetization method of permanent magnet motors", IOS press; International Journal of Applied Electromagnetics and Mechanics, vol. 20 (2004), pp. 125-131.
Lee and Kwon; "Design of Post-Assembly Magnetization System of Line Start Permanent-Magnet Motors Using FEM"; IEEE Transactions on Magnetics, vol. 41, No. 5, May 2005; pp. 1928-1931.
D. G. Dorrell, M.-F. Hsieh, and Y.-C. Hsu, "Post Assembly Magnetization Patterns in Rare-Earth Permanent-Magnet Motors"; IEEE Transactions on Magnetics, vol. 43, No. 6, Jun. 2007; pp. 2489-2490.
Search Report and Written Opinion from corresponding EP Application No. 10168227.6-1801 dated Sep. 18, 2013.
Unofficial English translation of Office Action issued in connection with corresponding CN Application No. 201010231158.1 on Sep. 26, 2013.
Unofficial English Translation of JP63-316658, Dec. 23, 1988.
Search report issued in connection with EP Application No. 10168227.6, Dec. 18, 2013.

* cited by examiner

*Primary Examiner* — Shawki S Ismail
*Assistant Examiner* — Lisa Homza
(74) *Attorney, Agent, or Firm* — Ann Marie Agosti (57) ABSTRACT

A magnetizer including at least one reconfigurable magnetic flux guide coil is disclosed. A method of magnetizing a permanent magnet in-situ a mechanical member is also disclosed.

11 Claims, 9 Drawing Sheets

IN-SITU MAGNETIZER

BACKGROUND

The invention relates generally to the area of magnetizers. More specifically, the invention relates to the area of magnetizers for magnets that are disposed in-situ in a mechanical member, such as a rotor of an interior permanent magnet machine, or a slider of a linear electric machine.

The rotors of many electric machines include permanent magnets that produce magnetic field flux, which magnetic field flux interacts electromagnetically with a stator. The electromagnetic interaction results in a conversion of electromagnetic energy to mechanical energy within the electric machine.

Interior permanent magnet electric machines constitute a class of electric machines in which the permanent magnets are buried within the bulk of the rotor. In an as-formed state, the permanent magnets do not have any net magnetic moment. However, the design principles of the electric machine require that the permanent magnets disposed within the bulk of the rotor be in a magnetized state before the electric machine can be put in operation.

Two approaches to magnetize the permanent magnets are known within the art. In the first approach, the permanent magnets are magnetized before they are disposed within the bulk of the rotor. This approach presents several drawbacks from the point of view of an industrial assembly process for electric machines. For instance, it will be appreciated that fully magnetized permanent magnet pieces would be subject to electromagnetic interaction with all surrounding objects, which in turn adds to the complexity of their handling procedures. In the second approach, as-formed permanent magnets are disposed within a rotor and a magnetizer is used to magnetize the permanent magnets. This approach also presents several drawbacks from the point of view of an industrial assembly process for electric machines. For instance, the energy and fabrication costs for magnetizers capable of generating, at the location of the permanent magnets, a magnetic field flux sufficient to magnetize the permanent magnets, are prohibitive. Typical prior art in-situ magnetizers are only able to economically magnetize permanent magnets disposed within low pole count rotors.

A magnetizer that is capable of economically providing user definable magnetic flux field configurations at the locations where the permanent magnets are disposed within the rotor, and having a design that is readily adaptable for electric machines of different sizes and configurations, would therefore be highly desirable.

BRIEF DESCRIPTION

Embodiments of the invention are directed to a magnetizer capable of magnetizing permanent magnets disposed in-situ a mechanical member. Non-limiting examples of mechanical members include, rotors, stators, and sliders.

A magnetizer including at least one reconfigurable magnetic flux guide coil.

A method of magnetizing a permanent magnet in-situ a mechanical member, said method including the steps of, (a) disposing a first conductive member along a perimeter of the permanent magnet, (b) disposing a second conductive member to mate with the first conductive member to form a magnetic flux guide coil, and (c) energizing the magnetic flux guide coil so that a magnetic field flux is generated within the bulk of the permanent magnet.

A magnetizer for an interior permanent magnet machine, including, at least one reconfigurable magnetic flux guide coil, and a magnetizer head comprising an electromagnet coil and a ferromagnetic member.

These and other advantages and features will be more readily understood from the following detailed description of preferred embodiments of the invention that is provided in connection with the accompanying drawings.

DETAILED DESCRIPTION

In the following description, whenever a particular aspect or feature of an embodiment of the invention is said to comprise or consist of at least one element of a group and combinations thereof, it is understood that the aspect or feature may comprise or consist of any of the elements of the group, either individually or in combination with any of the other elements of that group.

As discussed in detail below, embodiments of the invention are directed to magnetizers for permanent magnets in-situ a mechanical member such as a rotor. As used herein, the word "in-situ" refers to the fact that the magnet is positioned within the bulk of the rotor, for instance, within the backiron of the rotor. The rotor, for instance, may be a part of an electric machine. Quite generally, such machines in which the permanent magnets are positioned within the rotor will be referred to as interior permanent magnet machines. Embodiments of the system and method disclosed herein reliably enable magnetization of substantially the complete magnet in substantially the same direction in-situ in a mechanical member. Even those portions of the permanent magnets, for instance, portions that constitute the bulk of the permanent magnet, and which are disposed at a distance where previously it has not been possible to create a magnetizing field of sufficient magnitude and configuration, can be reliably magnetized via embodiments of the invention.

Figure 1:
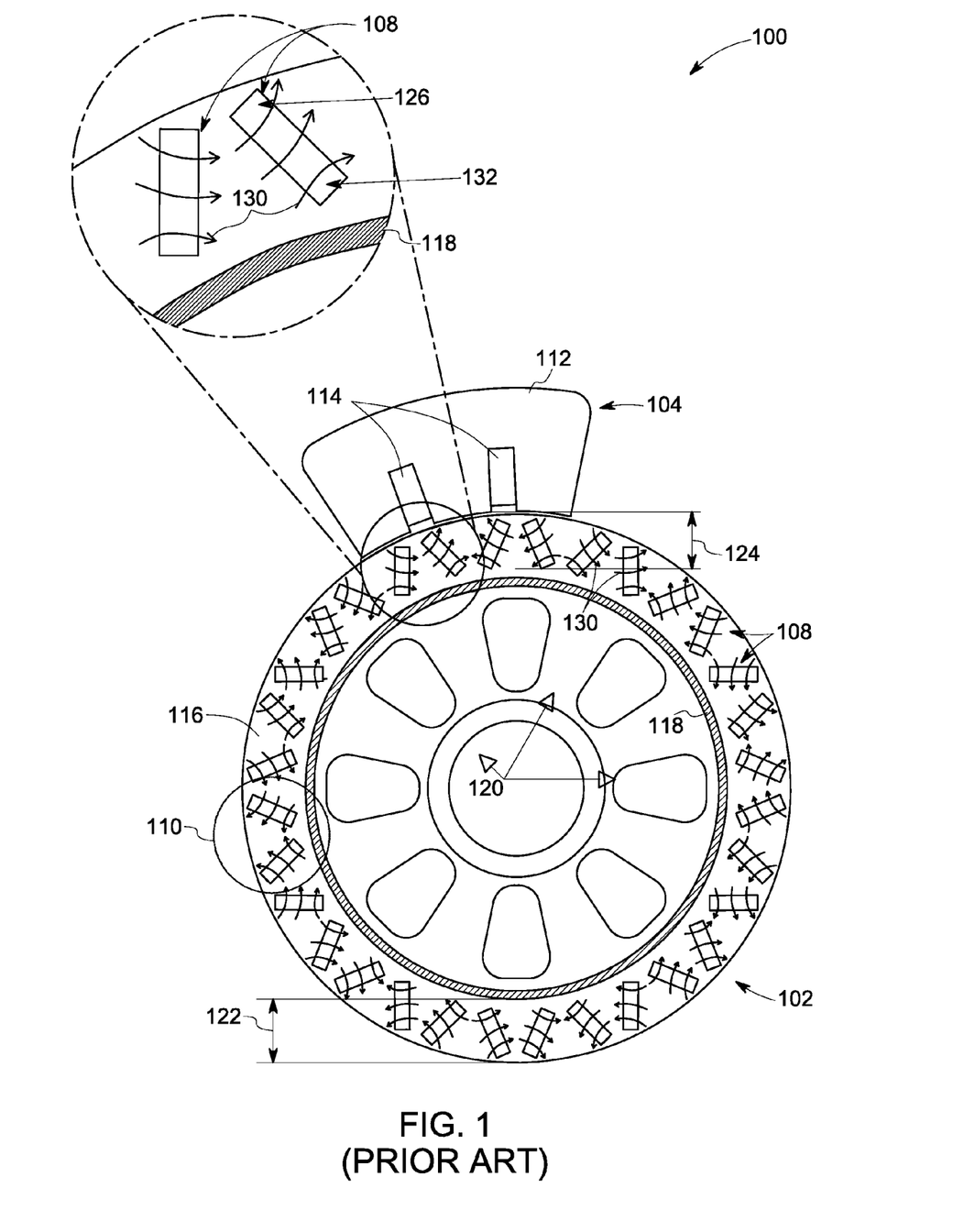
FIG. 1 is a diagrammatic illustration of a prior art arrangement for magnetizing a rotor using a prior art magnetizer.

FIG. 1 is a diagrammatic illustration 100 of a prior art arrangement for magnetizing a rotor 102 using a prior art magnetizer 104. The rotor, for instance, is part of a permanent magnet electric machine 106 (not depicted). The magnetizer 104 is disposed to magnetize one or more of a plurality of permanent magnets 108 disposed within the rotor 102. Various configurations for the disposition of the plurality of permanent magnets 108 within the rotor 102 are known in the art. For instance, in the embodiment shown in FIG. 1, the plurality of permanent magnets are disposed in a "V" shaped configuration 110. The magnetizer 104 includes a magnetizer head 112, and coils 114 that form the electromagnetic poles of the magnetizer 104. The coils 114 are energized to perform the magnetizing action of the magnetizer 104 whereby a magnetic field flux 130 is produced at least partially within the volumes occupied by the permanent magnets. The rotor 102 includes a backiron 116 usually constructed from laminated sheet metal. In the embodiment shown in FIG. 1, the plurality of permanent magnets 108 are positioned within the bulk of the backiron 116. The rotor 102 further includes a rotor tube 118 that is a magnetically inactive carrying structure. The rotor 102 also includes further structures 120 the purpose and operation of which would be known to one of skill in the art.

Electromechanical considerations, among other factors, dictate the thickness 122 of the rotor backiron 116. The considerations are related to, for instance, the amount of permanent magnetic material that is required to be contained within the backiron 116, the arrangement of the permanent magnetic material required for a particular operational rating, and the intended application of the permanent magnet electric machine 106. Such considerations are known to one of skill in the art. Such considerations therefore, dictate the minimum thickness of the backiron 116, which in turn fixes the minimum possible distance scale 124 between the magnetizer 104 and the permanent magnets. The magnetizing action of the permanent magnets must be reliably performed over this distance scale 124. Reliable in-situ magnetizing of portions 132 of the permanent magnets that are disposed "distally" with respect to the magnetizer 104 (as opposed to portions 126 of the permanent magnets that relatively are disposed closer "proximally" to the magnetizer 104) remains a challenge within the art.

Figure 2:
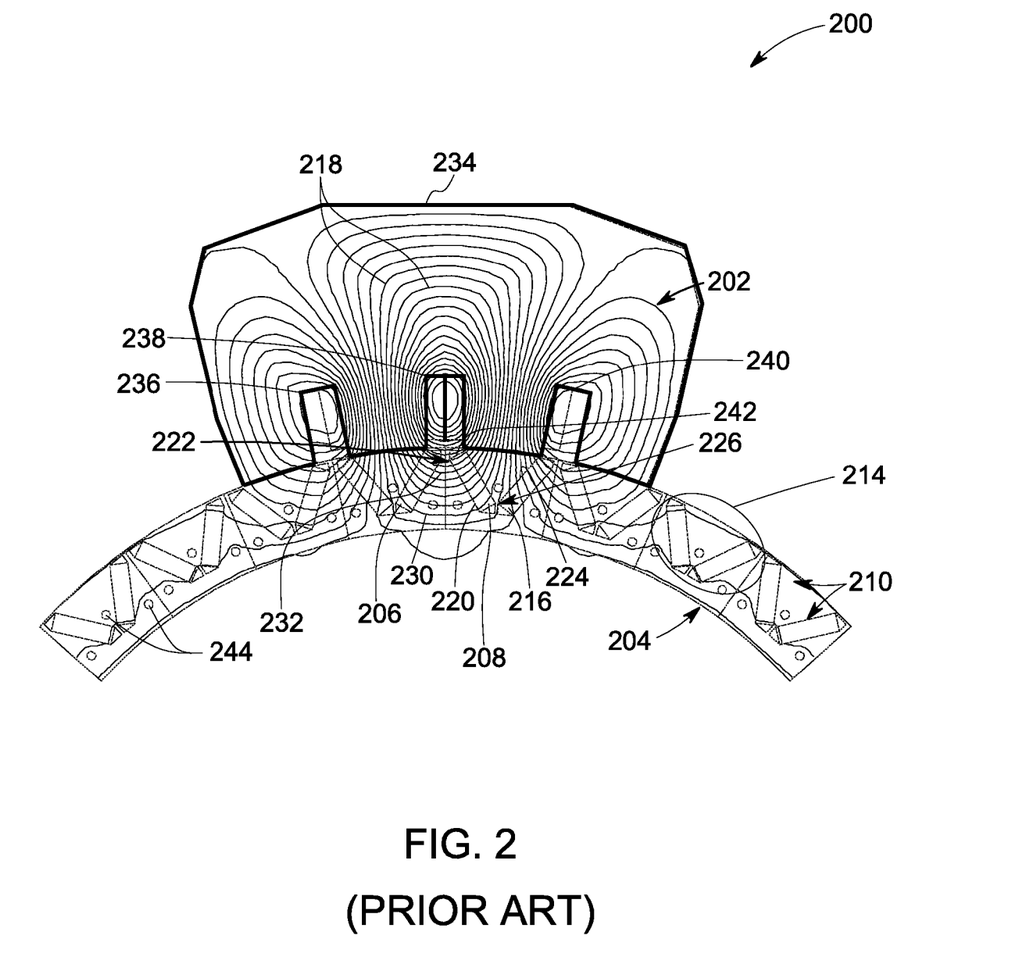
FIG. 2 is a depiction of a contour plot of a simulated magnetizing field produced via a typical prior art magnetizer.

For instance, FIG. 2 is a depiction 200 of a contour plot 202 of a simulated magnetizing field produced via a typical prior art magnetizer of type 104 (FIG. 1). The contour plot 202 is shown superimposed onto the schematic depiction of a rotor 204. The magnetizer 234 that creates the magnetic field according to contour plot 202 is disposed with respect to the rotor 204 similarly to as shown in FIG. 1, that is, externally to the rotor 204, and so that it is substantially symmetrically disposed with respect to the permanent magnets 206 and 208 of the plurality of permanent magnets 210. The magnetizer 234 includes, for instance, two coils (not depicted) that are span magnetizer pole cavities 236 and 238, and magnetizer pole cavities 238 and 240. The strength of a magnetizing field produced at any spatial location is indicated via a density of contour lines of the contour plot 202. In the rotor embodiment 204, the plurality of permanent magnets 210 are disposed in a "V" shaped configuration 214. The rotor embodiment 204 may further include other structures 244 which would be known to one of skill in the art. The discussions in relation to at least FIGS. 3-4, and FIGS. 8-9 will be with respect to an assumed representative value of saturation magnetizating magnetic field $H_{Sat}$ of about 1.5 Mega Ampere per meter (MA/m). (This is a typical number for permanent magnet materials known in the art.) The magnetizing field configuration produced by the magnetizer 234 is now discussed in relation to permanent magnets 208 (FIG. 3), and 216 (FIG. 4), disposed at increasing distance, and oriented differently, with respect to the magnetizer 234.

It is evident that contour lines 218 do not flow substantially parallel to the rotor design magnetization direction over the volume occupied by the permanent magnet 208. In the embodiment shown in FIG. 2, the rotor design magnetization direction is parallel to the short edge of any particular permanent magnet. For instance, for the permanent magnet 208, the design magnetization direction is parallel to the short edge 242. For instance, as may be evident from the flow of the magnetic field contours as depicted over the permanent magnet 208, the direction of the magnetic field produced by the magnetizer 234 is substantially not the same along different regions of the long edge (for instance, 220) of the permanent magnet 208. In particular, it is evident, for instance, that the magnetizing field corresponding to contour lines 230 and 232 would magnetize the corresponding portions of the permanent magnet 208 in differing directions. (The direction of magnetization resulting due to a magnetizing field, at any particular location, is substantially the direction of the tangent (not shown) to the corresponding contour line.) Furthermore, as would be appreciated by one of skill in the art, two adjacent permanent magnets constitute a pole of the rotor, and rotor design considerations require that the two adjacent permanent magnets constituting a pole of the rotor have opposite magnetizations. In other words, rotor design considerations require that the magnetization of permanent magnets 206 and 208 be in a first direction, while the magnetization of permanent magnet 216 is required to be in a second direction that is opposite to the first direction.

Figure 3:
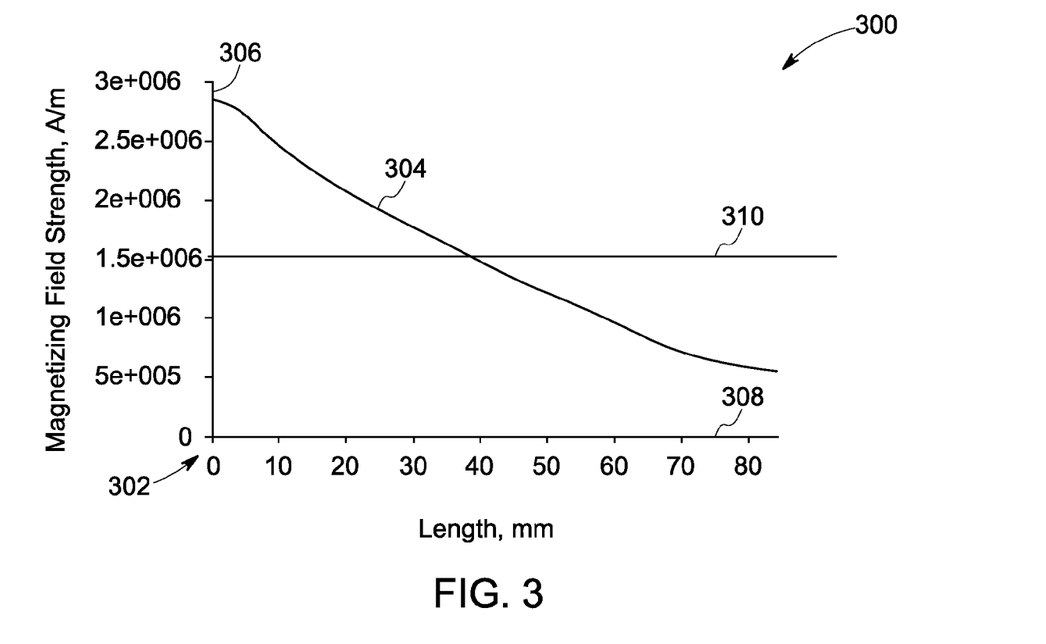
FIG. 3 is a graph showing the magnetizing field strength corresponding to the contour plot shown in FIG. 2 available along a long edge of a permanent magnet positioned within a rotor.

FIG. 3 is a graph 300 showing the magnetizing field strength corresponding to the contour plot 202, available along the long edge 220 of the permanent magnet 208. The origin 302 of graph 300 corresponds to vertex 222 of the permanent magnet 208. The graph 300 then plots the simulated value of magnetizing field strength 304 along the ordinate 306 as a function of the distance from origin along the long edge 220, plotted along the abscissa 308. The saturation magnetizing magnetic field $H_{Sat}$ value 310 is also shown. It may be evident that the magnetizing field strength 304 exceeds $H_{Sat}$ only to a distance, from the vertex 222 along the long edge 220, of about 40 millimeters (mm). Evidently therefore, the prior art magnetizer 234 will prove to be inadequate to reliably magnetize the permanent magnet 208 in its entirety.

Figure 4:
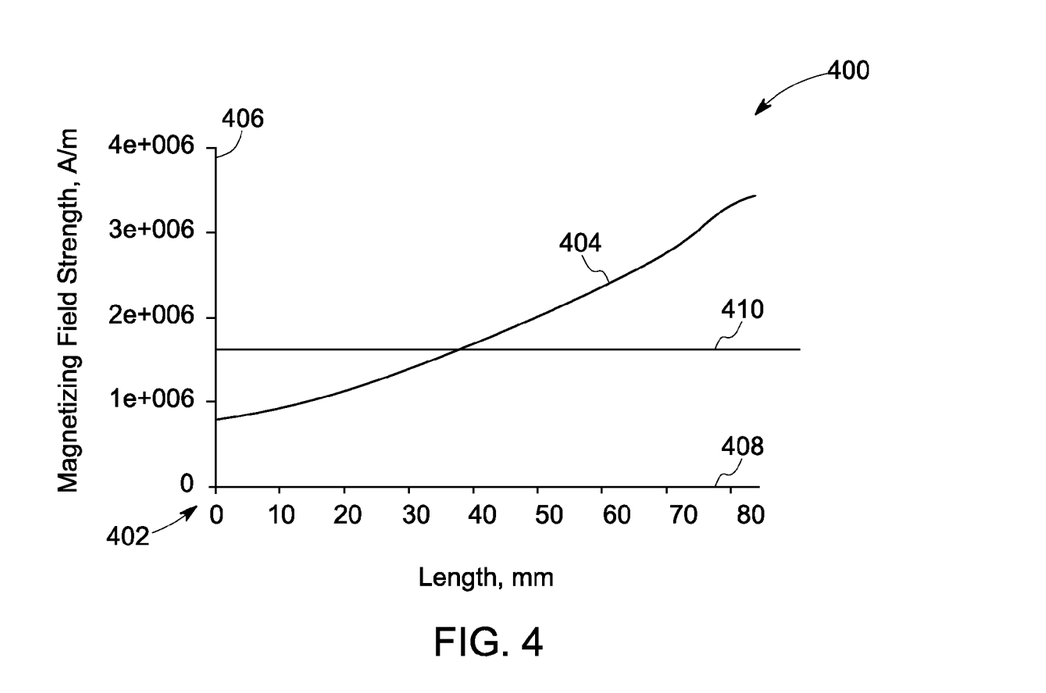
FIG. 4 is a graph showing the magnetizing field strength corresponding to the contour plot shown in FIG. 2 available along a long edge of a permanent magnet positioned within a rotor.

FIG. 4 is a graph 400 showing the magnetizing field strength corresponding to the contour plot 202, available along a long edge 224 of the permanent magnet 216. The origin 402 of graph 400 corresponds to vertex 226 of the permanent magnet 216. The graph 400 then plots the simulated value of magnetizing field strength 404 along the ordinate 406 as a function of the distance from origin along the long edge 224, plotted along the abscissa 408. The saturation magnetizing magnetic field $H_{Sat}$ value 410 is also shown. It may be evident that the magnetizing field strength 404 exceeds $H_{Sat}$ only after a distance from the vertex 226 along either of the edges 224 of about 40 mm. Evidently therefore, the prior art magnetizer arrangement will prove to be inadequate to reliably magnetize the permanent magnet 216 in its entirety.

Figure 5:
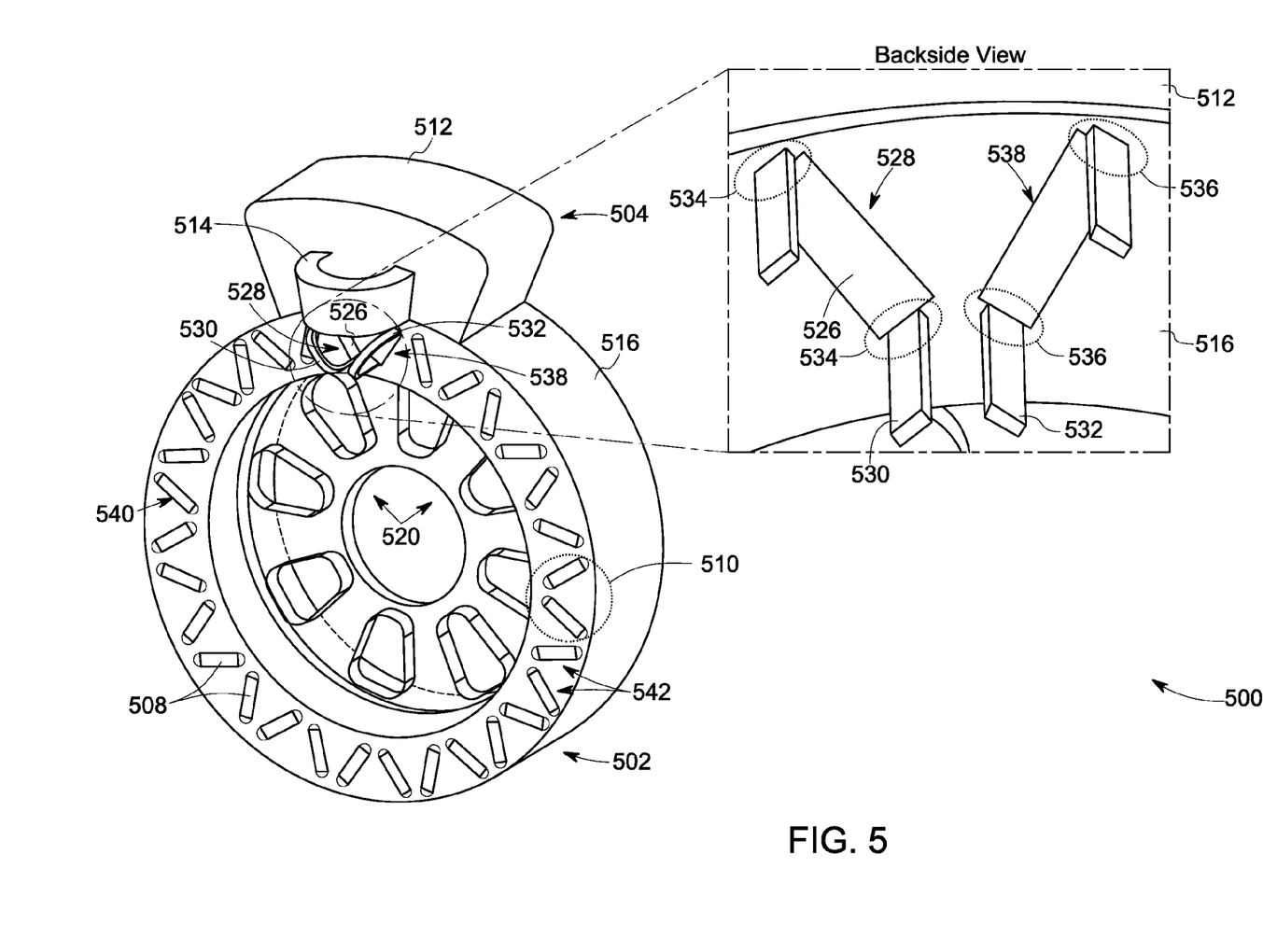
FIG. 5 is a diagrammatic illustration of a magnetizer arrangement, in accordance with one embodiment of the invention.

Embodiments of the invention disclosed herein improve at least over the above-mentioned inadequacies of the prior art magnetizer 234 arrangement. FIG. 5 is a diagrammatic illustration 500 of a magnetizer arrangement for magnetizing a rotor 502 using a magnetizer 504 in accordance with one embodiment of the invention. The rotor 502, for instance, is part of a permanent magnet electric machine 506 (not depicted). The magnetizer 504 is positioned to magnetize one or more of a plurality of permanent magnets 508 disposed within the rotor 502. In the rotor embodiment 502 shown in FIG. 5, the plurality of permanent magnets are disposed in a "V" shaped configuration 510. The magnetizer 504 includes a magnetizer head 512, and coils 514 that form the electromagnetic poles of the magnetizer 504. The rotor 502 includes a backiron 516 usually constructed from laminated sheet metal. In the rotor embodiment shown in FIG. 5, the plurality of permanent magnets 508 are positioned within the bulk of the backiron 516. The rotor 502 further includes other structures 520, the purpose and operation of which would be known to one of skill in the art. The magnetizer 504 further includes at least one reconfigurable magnetic flux guide coil 530, 532. The embodiment shown in FIG. 5 includes two reconfigurable magnetic flux guide coils. However, magnetizers of type 504 designed with other numbers of reconfigurable magnetic flux guide coils fall within the scope of the present invention.

Quite generally therefore, embodiments of the invention include a magnetizer (for instance, of type 504), including at least one reconfigurable magnetic flux guide coil (for instance, of type 530, 532). Embodiments of the at least one reconfigurable magnetic flux guide coil includes at least one conductive member. For instance, the at least one reconfigurable magnetic flux guide coil may include copper wire. The at least one reconfigurable magnetic flux guide coil may be removably disposed at least partially around any one or more permanent magnet of the plurality of permanent magnets (for instance, of type 508). Energization of the at least one reconfigurable magnetic flux guide coil, for instance, via passage of electric current through the coil, leads to the creation of a magnetic field flux (not depicted) that flows at least within the loop of the coil, and which magnetic field flux is used to magnetize one or more of the plurality of permanent magnets. In one embodiment of the invention, for instance the embodiment shown in FIG. 5, the reconfigurable magnetic flux guide coils are disposed immediately adjacent to one or more permanent magnets of the plurality of permanent magnets. In alternate embodiments of the invention (for instance, the embodiment shown in FIG. 7), the reconfigurable magnetic flux guide coils are disposed so that portions of the rotor backiron lie between the reconfigurable magnetic flux guide coil and any one or more permanent magnets of the plurality of permanent magnets.

Alternate embodiments of the magnetizer further include a magnetizer head (for instance, of type 512) including an electromagnet coil (for instance, of type 514) and a ferromagnetic member (for instance, a magnetizer head of type 512 composed from a ferromagnetic material), which ferromagnetic member supports a magnetic field flux produced (not depicted) by the magnetizer. In alternate embodiments of the magnetizer, at least a portion of the at least one reconfigurable magnetic flux guide coil is disposed along a periphery 540 of any one or more of a plurality of poles 542.

As shown in FIG. 5, any individual permanent magnet of the plurality of permanent magnets 508 sits within a rotor pole cavity, that is, within one of the poles of the plurality of poles 542, within the rotor backiron 516. For instance, the permanent magnet 526 sits within a rotor pole cavity 528. The rotor cavity can be designed and constructed so that, in addition to housing a permanent magnet, room remains within it to accommodate additional members such as reconfigurable magnetic flux guide coils. For instance, as shown in FIG. 5, a pair of reconfigurable magnetic flux guide coils 530 and 532 are accommodated substantially within portions 534 and 536 of rotor pole cavities 528 and 538.

Figure 6:
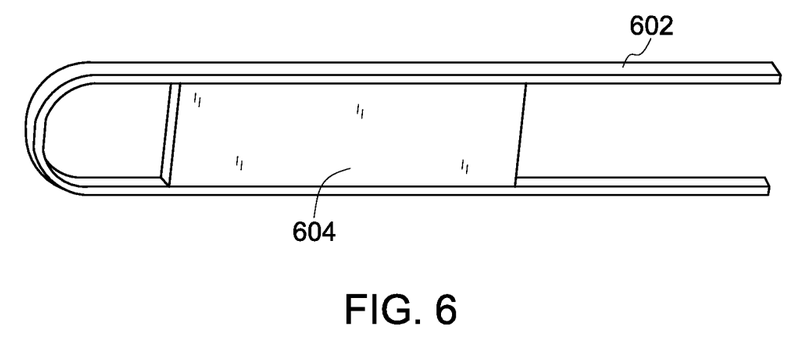
FIG. 6 is a diagrammatic illustration of how a reconfigurable magnetic flux guide coil wraps around a permanent magnet, in accordance with one embodiment of the invention.

In one embodiment, the reconfigurable magnetic flux guide coils are disposed so that they removably wrap around any particular permanent magnet. For instance, FIG. 6 diagrammatically illustrates how a reconfigurable magnetic flux guide coil 602 wraps around a permanent magnet 604 that is disposed within a rotor backiron (for instance, of type 516; not shown).

Figure 7:
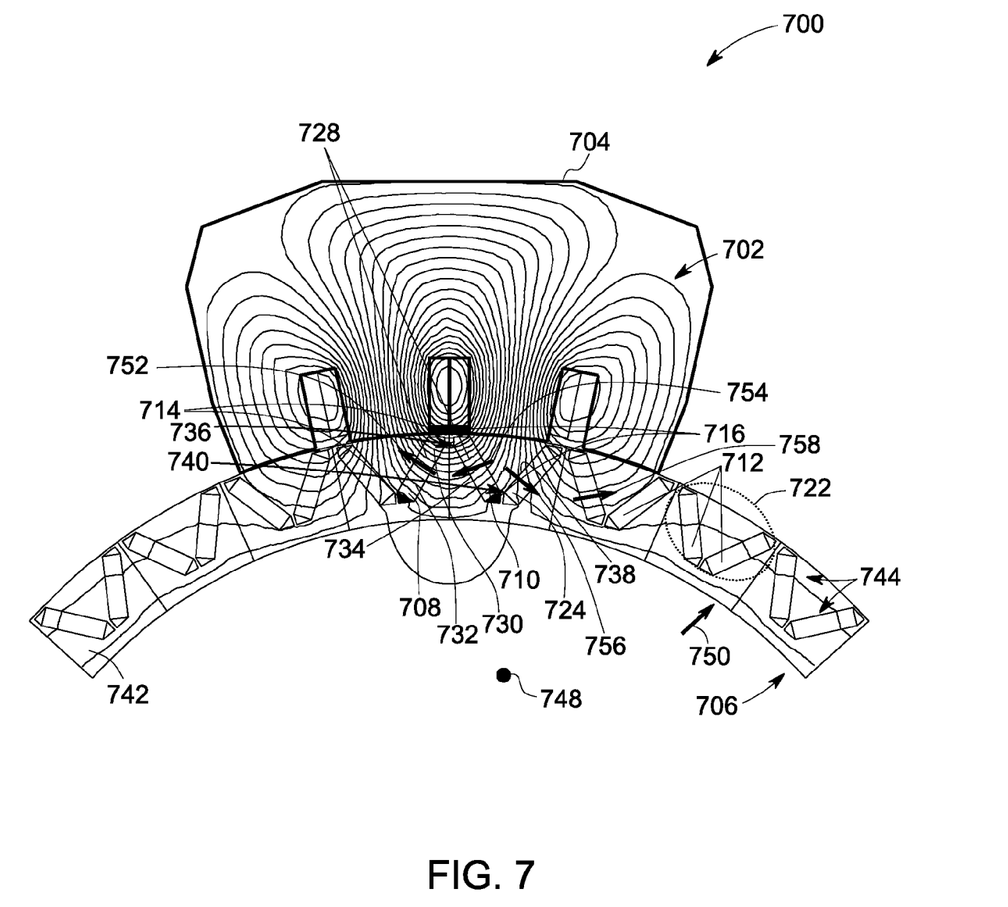
FIG. 7 is a depiction of a contour plot of simulated magnetizing field produced via a magnetizer, in accordance with one embodiment of the invention.

FIG. 7 is a depiction 700 of a contour plot 702 of simulated magnetizing field produced via a magnetizer 704 of type 504 (FIG. 5). In the interest of clarity, only certain components of the magnetizer 704 are depicted, as discussed below. In particular, only reconfigurable magnetic flux guide coils 714 and 716, of the magnetizer 704 disposed respectively around permanent magnets 708 and 710, are shown. Furthermore, the magnetizer head 720, which is of type 512, is not shown. The contour plot 702 is shown superimposed onto the schematic depiction of a rotor 706 of type 502 (FIG. 5). The magnetizer 704 that created the magnetic field according to contour plot 702 is disposed with respect to the rotor 706 similarly to as shown in FIG. 5, that is, externally to the rotor 706, and so that it is substantially symmetrically disposed with respect to permanent magnets 708 and 710 of the plurality of permanent magnets 712. The strength of magnetizing field produced at any spatial location is indicated via the density of the contour lines of the contour plot 702. In the rotor embodiment 706, the plurality of permanent magnets 712 are disposed in a "V" shaped configuration 722. The magnetizing field configuration produced by the magnetizer 704 is now discussed in relation to permanent magnets 710 (FIG. 8), and 724 (FIG. 9), disposed at increasing distance, and oriented differently, with respect to the magnetizer 704.

It is evident from FIG. 7 that contour lines 728 flow substantially parallel to each other and to the design magnetization direction. In the embodiment shown in FIG. 7, the design magnetization direction is substantially parallel to the short edge of any particular permanent magnet, and indicated by arrows 752, 754, 756, and 758. Furthermore, it may be evident from FIG. 7, that the direction of the magnetizing field produced by the magnetizer 704 is substantially the same along the body of the permanent magnet. In particular, it is evident, for instance, that the magnetizing field corresponding to contour lines 730 and 732 would magnetize the corresponding portion of the permanent magnet 708 in substantially the same direction. As would be appreciated by one of skill in the art, all other factors being substantially the same, a rotor magnetized according to the scheme shown in FIG. 7, is likely to transmit more power as compared to a rotor magnetized according to the scheme shown in FIG. 5.

Quite generally therefore, magnetizers according to embodiments of the present invention are capable of magnetizing substantially completely in substantially a same direction at least one of a plurality of permanent magnets buried within a mechanical member. Non-limiting examples of a mechanical member include a backiron 742 of a rotor (for instance, of type 706) comprising a plurality of poles 744. Quite generally, the plurality of permanent magnets 712 are housed within the plurality of poles 744. In one embodiment of the invention, the plurality of permanent magnets are oriented along a substantially radial direction 750. In one embodiment of the invention, the rotor is part of an interior permanent magnet electric machine (not depicted), or of a linear electric machine (not depicted). Principles of design and construction of interior permanent magnet electric machines are well known in the art. In one embodiment of the invention, the rotor includes a plurality of laminations stacked so as to be oriented along an axial direction 748 of the rotor. Principles of design and construction of rotors are well known in the art.

Figure 8:
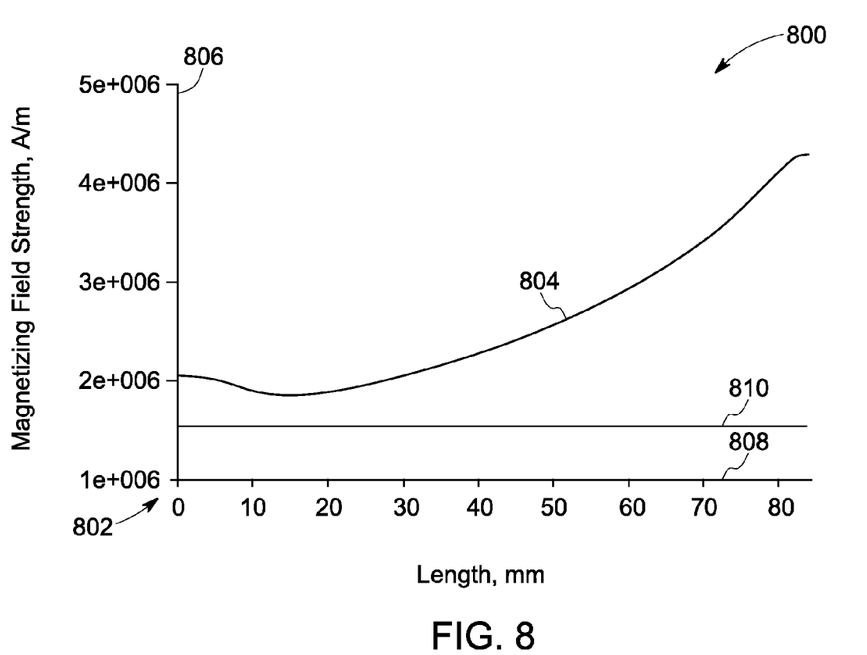
FIG. 8 is a graph showing the magnetizing field strength corresponding to the contour plot shown in FIG. 7 available along a long edge of a permanent magnet positioned within a rotor, in accordance with one embodiment of the invention.

FIG. 8 is a graph 800 showing the magnetizing field strength corresponding to the contour plot 702, available along a long edge 734 of the permanent magnet 710. The origin 802 of graph 800 corresponds to vertex 736 of the permanent magnet 710. The graph 800 then plots the simulated value of magnetizing field strength 804 along the ordinate 806 as a function of the distance from origin 802 along the long edge 734, plotted along the abscissa 808. The saturation magnetizing magnetic field $H_{Sat}$ value 810 is also shown. It may be evident that the magnetizing field strength 804 exceeds $H_{Sat}$ along the entire length of the permanent magnet 710. Evidently therefore, the magnetizer 704 arrangement will prove to be adequate to reliably magnetize the permanent magnet 710 in its entirety.

Figure 9:
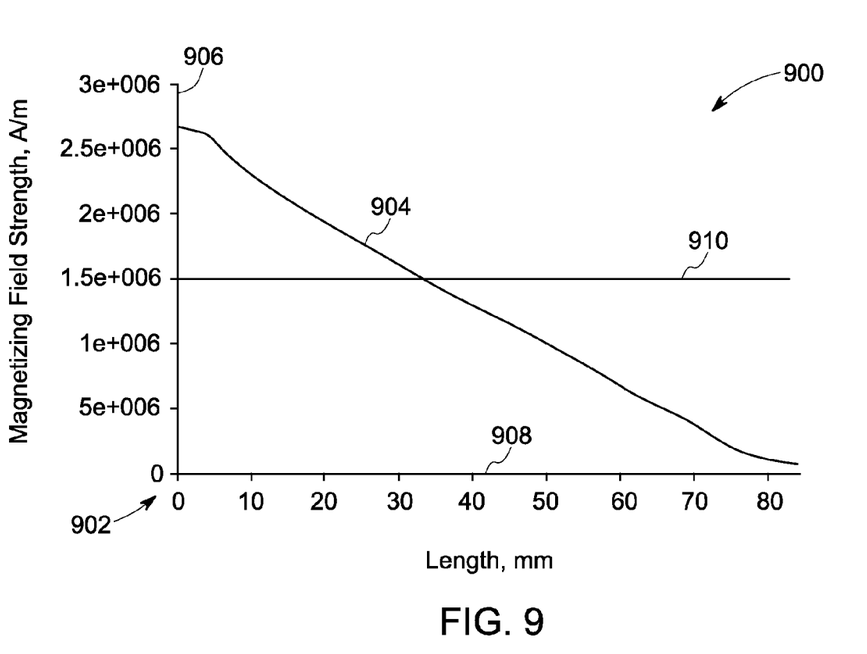
FIG. 9 is a graph showing the magnetizing field strength corresponding to the contour plot shown in FIG. 7 available along a long edge of a permanent magnet positioned within a rotor, in accordance with one embodiment of the invention.

FIG. 9 is a graph 900 showing the magnetizing field strength corresponding to the contour plot 702, available along either of a long edge 738 of the permanent magnet 724. The origin 902 of graph 900 corresponds to vertex 740 of the permanent magnet 724. The graph 900 then plots the simulated value of magnetizing field strength 904 along the ordinate 906 as a function of the distance from origin 902 along either the long edge 738, plotted along the abscissa 908. The saturation magnetizing magnetic field $H_{Sat}$ value 910 is also shown. It may be evident that the magnetizing field strength 904 exceeds $H_{Sat}$ uptil a distance from the vertex 740 along the long edge 738 of about 35 mm.

Figure 10:
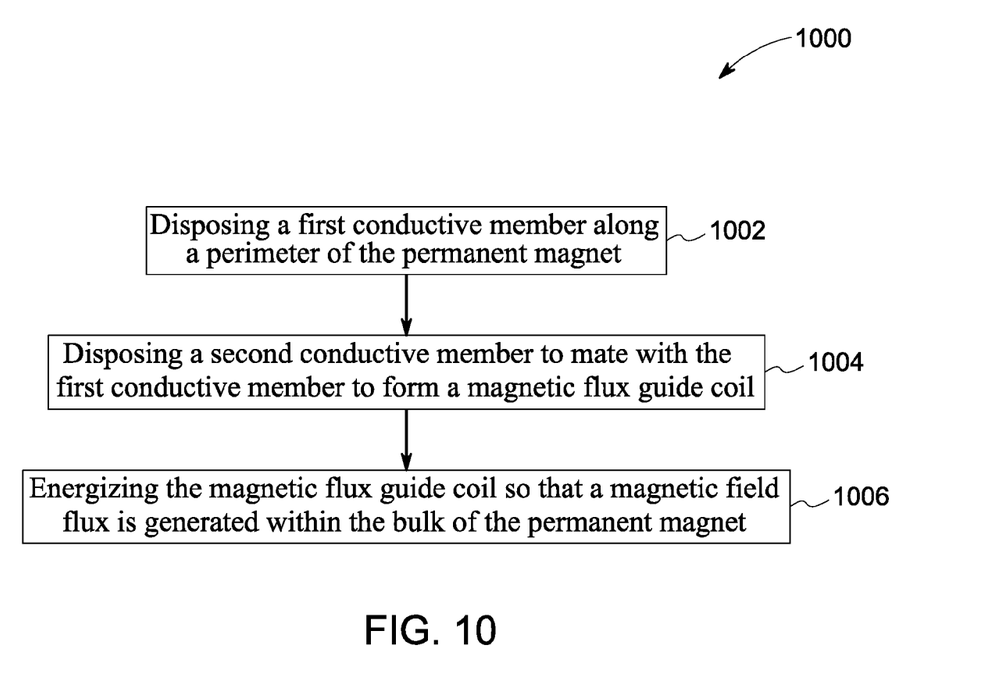
FIG. 10 is a flow chart depiction of a method of magnetizing a permanent magnet in-situ within a mechanical member, in accordance with one embodiment of the invention.
Figure 11:
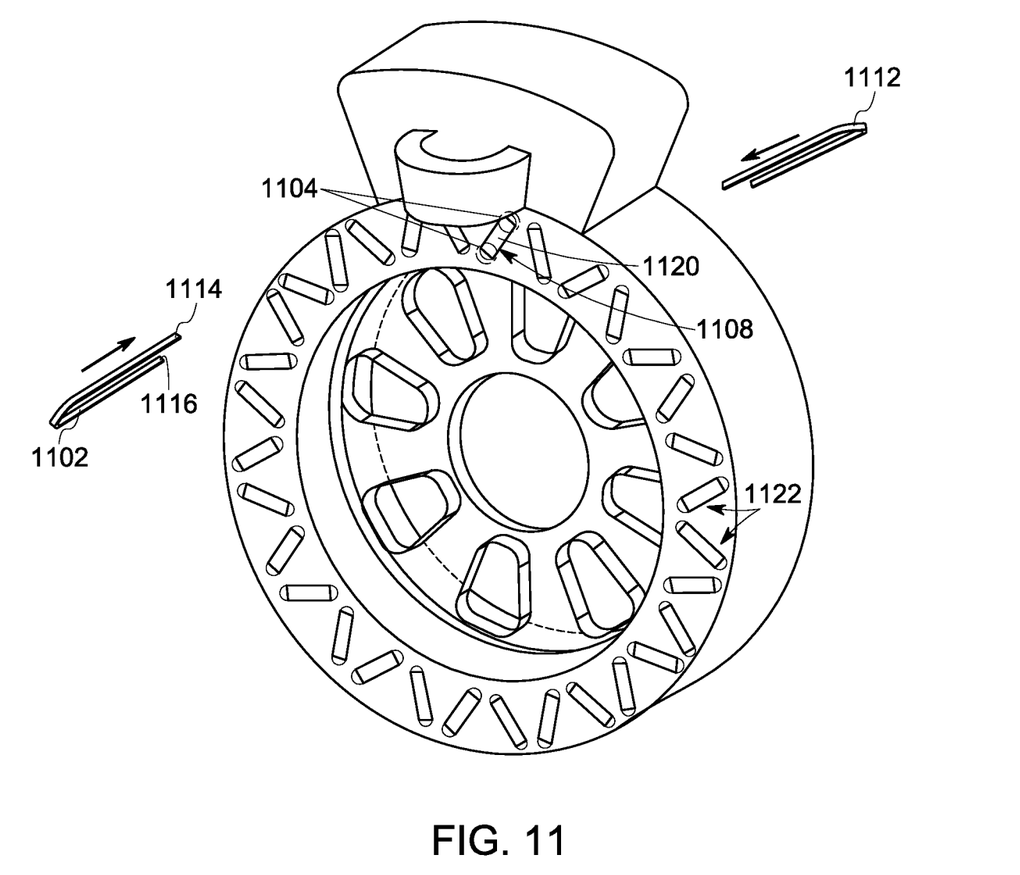
FIG. 11 is a diagrammatic illustration of the method of magnetizing a permanent magnet in-situ within a mechanical member depicted in FIG. 10, in accordance with one embodiment of the invention.

FIG. 10 is a flow chart depiction of a method 1000 of magnetizing a permanent magnet in-situ within a mechanical member in accordance with one embodiment of the invention. The method 1000 includes a step 1002 of disposing a first conductive member along a perimeter or periphery (for instance, of type 540) of the permanent magnet (for instance, of type 708). An embodiment of step 1002 is graphically illustrated via FIG. 11, whereby a first conductive member 1102 is inserted into portions 1104 (for instance, of type 534) of rotor pole cavity 1108 (for instance, of type 528). The method 1000 also includes a step 1004 of disposing a second conductive member to mate with the first conductive member 1102 to form a magnetic flux guide coil. An embodiment of step 1004 is graphically illustrated via FIG. 11, whereby a second conductive member 1112 is disposed to mate with the ends 1114 and 1116 of the first conductive member 1102 to form a reconfigurable magnetic flux guide coil (for instance, of type 530). As shown in FIG. 11, steps 1002 and 1004 may be executed so that at least a portion of the magnetic flux guide coil is disposed around the permanent magnet 1120. For instance, at least a portion of the magnetic flux guide coil may be disposed along a periphery of any one of the plurality of poles 1122. The method 1000 also includes a step 1006 of energizing the magnetic flux guide coil so that a magnetic field flux is generated within the bulk of the permanent magnet. In one embodiment of the invention, an electric current is passed through the reconfigurable magnetic flux guide coil to energize it, which in turn leads to the creation of a magnetic field (in accordance with well known physical principles; not depicted) within the volume occupied by the permanent magnet 1120 (for instance, of type 604).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A magnetizer, comprising:
    At least one reconfigurable magnetic flux guide coil removably disposed at least partially around a respective permanent magnet disposed within a respective one of a plurality of pole cavities of a mechanical member comprising a rotor of an electric machine; wherein at least a portion of the at least one reconfigurable magnetic flux guide coil is disposed along a periphery of the respective pole cavity with a first portion situated between the respective permanent magnet and a center of the rotor and a second portion situated between the respective permanent magnet and an outer perimeter of the rotor.

2. The magnetizer of claim 1, further comprising a magnetizer head comprising an electromagnet coil and a ferromagnetic member.

3. The magnetizer of claim 1, wherein the electrical machine comprises an interior permanent magnet electric machine or a linear electric machine.

4. The magnetizer of claim 1, wherein the rotor comprises a plurality of laminations stacked oriented along an axial direction of the rotor.

5. The magnetizer of claim 1, wherein each of the plurality of permanent magnets is oriented along a substantially radial direction.

6. The magnetizer of claim 1, wherein at least a portion of the reconfigurable magnetic flux guide coil is disposed immediately adjacent to the any one or more permanent magnet of the plurality of permanent magnets.

7. The magnetizer of claim 1, wherein each of the at least one reconfigurable magnetic flux guide coil comprises at least one conductive member.

8. A magnetizer for an interior permanent magnet machine, comprising:
    at least one reconfigurable magnetic flux guide coil removably disposed at least partially around a respective permanent magnet disposed within a respective one of a plurality of pole cavities of a mechanical member comprising a rotor of the interior permanent magnet machine; wherein at least a portion of the at least one reconfigurable magnetic flux guide coil is disposed along a periphery of the respective pole cavity with a first portion situated between the respective permanent magnet and a center of the rotor and a second portion situated between the respective permanent magnet and an outer perimeter of the rotor, and
    a magnetizer head comprising an electromagnet coil and a ferromagnetic member.

9. The magnetizer of claim 8, wherein at least a portion of the at least one reconfigurable magnetic flux guide coil is disposed along a periphery of the respective pole cavity with a first portion situated between the respective permanent magnet and a center of the rotor and a second portion situated between the respective permanent magnet and an outer perimeter of the rotor.

10. The magnetizer of claim 8, wherein individual permanent magnets belonging to the plurality of permanent magnets are oriented along a substantially radial direction of the mechanical member.

11. The magnetizer of claim 8, wherein at least a portion of the reconfigurable magnetic flux guide coil is disposed immediately adjacent to the any one or more permanent magnet of the plurality of permanent magnets.

* * * * *